Jan. 10, 1928.
E. WEIL
1,655,851
LIGHTING SYSTEM FOR VEHICLES
Filed Aug. 7, 1923
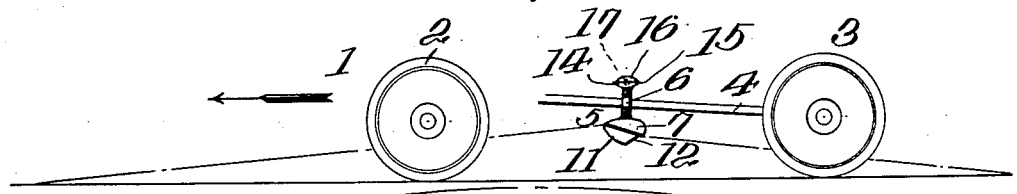
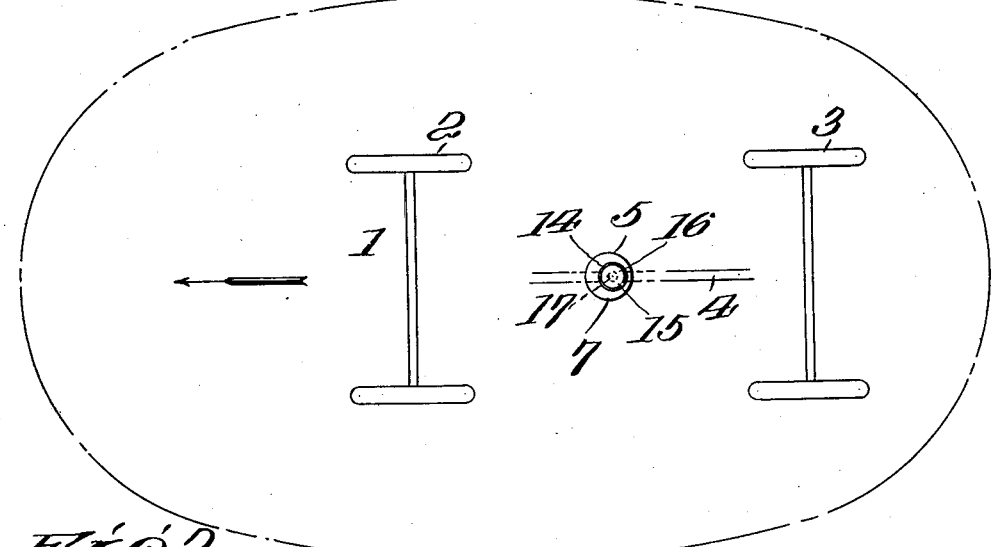
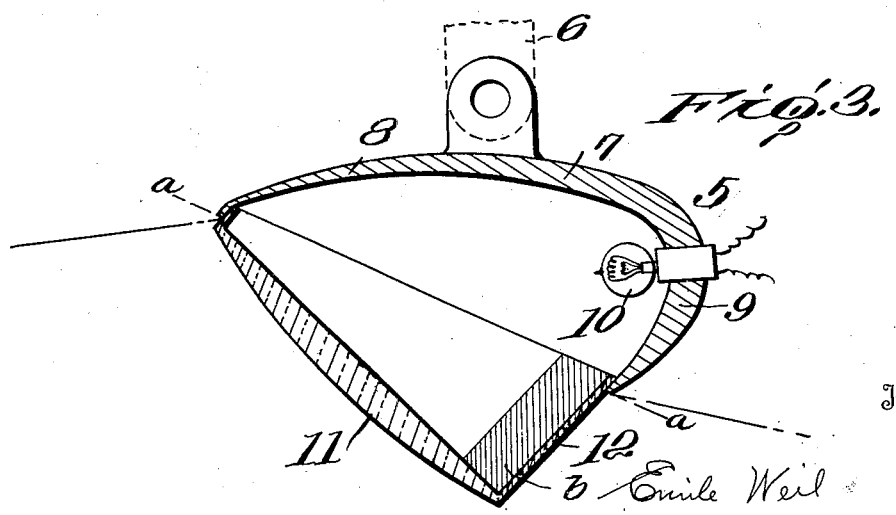
Inventor
Emile Weil
By Sturtevant & Mason
Attorney Patented Jan. 10, 1928.

1,655,851

UNITED STATES PATENT OFFICE.

EMILE WEIL, OF NEW ORLEANS, LOUISIANA.

LIGHTING SYSTEM FOR VEHICLES.

Application filed August 7, 1923. Serial No. 656,163.

My invention relates to a lighting system for vehicles, and particularly to automobiles.

An object of the invention is to provide a safety lighting system for vehicles, whereby a field of light may be formed at the sides and in front of the vehicle against which field of light the running wheels and the lower portion of the vehicle are silhouetted to the view of an approaching vehicle or pedestrian, while the source of light is hidden from view.

A further object of the invention is to provide a lighting system of the above character wherein the source of light is suspended beneath the body portion of the vehicle and back from the forward end thereof, so that the body portion of the vehicle will cover the source of light from view of an approaching vehicle or pedestrian.

A still further object of the invention is to provide a lighting system of the above type, wherein said source of light is so constructed as to throw a field of light in rear of the vehicle as well as in front, but to a greater extent in front of the vehicle.

A still further object of the invention is to provide a lighting system of the above type which is so constructed with the field of light from said source completely surrounding the vehicle, so that the entire vehicle is silhouetted on the field of light to the view of an approaching pedestrian or vehicle.

These and other objects will in part be obvious and will in part be hereinafter more fully disclosed.

In the drawings which show by way of illustration one embodiment of the invention—

Figure 1 is a side view, showing more or less diagrammatically portions of an automobile with my improved lighting system applied thereto;

Fig. 2 is a plan view of the same, but showing by broken lines the field of light formed by my improved lighting system; and Fig. 3 is an enlarged sectional detail view of one form of lighting means which may be used in connection with my invention.

In carrying out the invention, I have provided a source of light which is suspended beneath the body portion of the vehicle and preferably midway between the forward and rear end of the vehicle. Said source of light is located well above the clearance so that the same will not be struck by any projections over which the vehicle is capable of passing.

The light is so shaped as to throw rays of light in a forward direction principally, but also rearwardly and at the sides, for the purpose of forming a field of light which completely surrounds the vehicle and against which the vehicle is silhouetted to the view of an approaching vehicle or pedestrian.

In the drawings which show one embodiment of the invention, I have illustrated diagrammatically a motor vehicle 1, which includes running wheels 2—2 and 3—3, which may be of the usual construction. These parts have been described specifically merely to locate the position of the vehicle in the field of light. In the present embodiment of the invention, the housing for the driving shaft is indicated at 4.

My improved lighting system consists of a source of light 5, which is suspended by means of a bracket 6, from the housing of the driving shaft 4. This source of light includes a reflector 7, having a substantially horizontal portion 8 and a rear portion 9, and a lamp located at 10. The reflecting hood is closed by means of a lens 11, which is preferably formed with a cylindrical portion 12. Said cylindrical portion 12 is cut on the line a—a, so that the parts at the sides and in rear are of greater depth than that in front. This cylindrical portion instead of being made integral with the lens 11, may be made separate therefrom. The essential feature thereof is that it shall be so constructed as to throw light at the sides and in the rear. The particular construction of the lens and the light transmitting portions of the lamp are immaterial except in that they should be so constructed and arranged that the rays of light from the lamp 10 will be projected forward to a point well in advance of the vehicle and also to the sides some distance beyond the running wheels. I also prefer to have the rays of light thrown to some distance in rear of the rear wheels. The essential feature, however, is that the light shall be principally thrown forward and for some distance in front of the running wheels. I have found that if the light be so constructed and adjusted, the rays of light will extend ten or fifteen feet in front of the vehicle; three or four feet at each side of the vehicle and two or three feet in rear of the vehicle. The lower portion of the vehicle will be silhouetted against the field of light to an approaching vehicle or pedestrian. This will enable the motor vehicle to be readily seen and as the light is beneath the body portion of the vehicle, well up from the running board and front portion thereof, the light will be concealed from the pedestrian or vehicle which is approaching.

By my arrangement of lighting system, a vehicle can be readily discernible by a vehicle or pedestrian approaching from the sides or rear of the vehicle carrying my safety lighting system. This location of the light, of course, relieves all glare and at the same time enables the vehicle to be readily seen. This lighting system will also light the road-bed, so that it may be readily followed in villages and cities. In country road driving, however, the usual headlights will be used.

While I have shown only one source of light, it will be readily understood that more than one may be used if found desirable. The lamp 10 as shown in the drawings, is provided with a filament 10ª which will produce a normal lighting of the lamp, and also with a filament 10ᵇ which produces a very dim light, and these filaments may be so controlled that the lamp 10 may be used with a dim light if an intense light is found annoying or too excessive for parking purposes. The reflector 7 is adjustably mounted on the bracket 6, so that the angle of the reflector may be shifted forward and back, as may be found necessary.

I may provide the cylindrical portion 12 of the lens with a section, indicated at b, which is colored red, so that the rays extending to the rear of the car will be colored red.

In the drawings, I have shown associated with the source of light, above described, an auxiliary light 14, which is above the driving shaft and consists of a reflector 15 and lens 16, and a lamp 17, so arranged as to throw the light up against the under part of the vehicle, which in turn will reflect the light back on the road bed. This light is particularly for parking purposes, but may be dispensed with if found desirable.

It is obvious that minor changes may be made in the details of construction and the arrangement of parts without departing from the spirit of the invention as set forth in the appended claim.

Having thus described my invention, what I claim as new and desire to secure by Letters Patent, is:

A safety lighting system for motor vehicles comprising in combination with a vehicle, a reflector having a substantially horizontal portion and a rear and a side portion, said side portion terminating in a plane extending from the front end of the horizontal portion to the lower end of said central rear portion, a source of light located in said rear portion adjacent said horizontal portion, a lens for closing said reflector, said lens having a cylindrical portion extending from the lens to the reflector, and means for suspending said reflector beneath the body portion of a vehicle and back from the front end thereof whereby a field of light is formed completely surrounding the vehicle extending to the rear and sides and in front of the vehicle, and to a greater extent in front whereby the wheels and the lower portion of the vehicle are silhouetted on the field of light to the view of an approaching vehicle or pedestrian while said source of light is hidden from view.

In testimony whereof, I affix my signature.

EMILE WEIL.